United States Patent
Mao-Cheia

(10) Patent No.: US 9,651,071 B2
(45) Date of Patent: May 16, 2017

(54) GLASS PANEL CLAMP

(71) Applicant: Jose Teixeira Mao-Cheia, Port Elizabeth (ZA)

(72) Inventor: Jose Teixeira Mao-Cheia, Port Elizabeth (ZA)

( * ) Notice: Subject to any disclaimer, the term of this patent is extended or adjusted under 35 U.S.C. 154(b) by 165 days.

(21) Appl. No.: 14/380,542

(22) PCT Filed: Feb. 21, 2013

(86) PCT No.: PCT/IB2013/051407
§ 371 (c)(1),
(2) Date: Aug. 22, 2014

(87) PCT Pub. No.: WO2013/124806
PCT Pub. Date: Aug. 29, 2013

(65) Prior Publication Data
US 2015/0043965 A1    Feb. 12, 2015

(30) Foreign Application Priority Data

Feb. 22, 2012    (ZA) .................................. 2012/01313

(51) Int. Cl.
*E06B 3/54*    (2006.01)
*F16B 5/06*    (2006.01)
(Continued)

(52) U.S. Cl.
CPC ............ *F16B 5/06* (2013.01); *E04F 11/1853* (2013.01); *E05D 5/0246* (2013.01); *E06B 3/54* (2013.01);
(Continued)

(58) Field of Classification Search
CPC . E04F 11/1851; E04F 11/1853; F05D 5/0246; E06B 3/54; E06B 3/5454;
(Continued)

(56) References Cited

U.S. PATENT DOCUMENTS

| | | | | |
|---|---|---|---|---|
| 6,250,975 B1* | 6/2001 | LaPointe | .................. | H01R 4/64 439/883 |
| 6,419,209 B1* | 7/2002 | Shepherd | ............ | E04F 11/1851 256/24 |
| 6,434,905 B1* | 8/2002 | Sprague | ................ | E06B 3/5454 49/501 |
| 8,549,817 B2* | 10/2013 | Burke | .................. | E06B 3/5454 52/716.8 |

(Continued)

FOREIGN PATENT DOCUMENTS

DE    8333442 U1    1/1984
DE    3531674 A1    3/1986
(Continued)

OTHER PUBLICATIONS

"How to Tell the Difference Between Countersink and Counterbore Screw Holes and Usage." Rockler Woodworking and Hardware. Jan. 4, 2010, [online], [retrieved on Jun. 23, 2016]. Retrieved from the Internet <URL: http://www.rockler.com/how-to/difference-countersink-counterbore-screw-holes-usage/ >.*
(Continued)

*Primary Examiner* — Josh Skroupa
(74) *Attorney, Agent, or Firm* — Polsinelli PC

(57) ABSTRACT

A fitting (10) is formed from by clamping first and second clamp bodies (12,14) of composite plastic material together, each of the clamp bodies being covered by a pressed stainless steel shell (36,38). Each of the clamp bodies (12,14) defines a grip formation (16) that faces a recess (26), so that an edge of a glass panel can be gripped between the grip formations (16)—preferably with soft pads (18). Fasteners such as bolts pass through apertures (24,25) extend through the shells (36,38) and bodies (12,14), to hold the entire fitting (10) together and to exert a gripping force on the glass panel.

12 Claims, 2 Drawing Sheets

(51) Int. Cl.
    *E04F 11/18*     (2006.01)
    *E05D 5/02*     (2006.01)

(52) U.S. Cl.
    CPC ............ *E06B 3/549* (2013.01); *E06B 3/5454* (2013.01); *E06B 3/5481* (2013.01); *F16B 5/0685* (2013.01); *F16B 5/0635* (2013.01); *Y10T 403/648* (2015.01); *Y10T 403/7067* (2015.01)

(58) Field of Classification Search
    CPC .......... E06B 3/5481; E06B 3/549; E06B 3/58; E06B 3/5807; E06B 3/60; E06B 3/605; F16B 5/06; F16B 5/0635; F16B 5/0685; Y10T 403/648; Y10T 403/7062; Y10T 403/7064; Y10T 403/7066; Y10T 403/7067; Y10T 403/71; Y10T 403/76; E05D 5/0246
    USPC ...... 403/338, 373, 374.1, 374.2, 374.3, 384, 403/409.1; 256/24, 31, 68–70, 73; 52/204.64, 504.65, 766, 767
    See application file for complete search history.

(56) References Cited

U.S. PATENT DOCUMENTS

2010/0275410 A1* 11/2010 Chang .................. E05D 5/0246
    16/277

FOREIGN PATENT DOCUMENTS

| DE | 9302303 U1 * | 4/1993 | .......... E04F 11/1851 |
| DE | 9403218 U1 * | 4/1994 | .......... E04F 11/1851 |
| EP | 1223350 A2 * | 7/2002 | ............ F16B 5/0635 |

OTHER PUBLICATIONS

"Thermoset Composites." Machine Design. Nov. 15, 2002, [online], [retrieved on Jun. 23, 2016]. Retrieved from the Internet <URL: http://machinedesign.com/basics-design/thermoset-composites>.*
Translation of DE 3531674. Loggen, Karl. Clamping device for fastening plates. Mar. 27, 1986.*

* cited by examiner

GLASS PANEL CLAMP

CROSS REFERENCE TO RELATED APPLICATIONS

This application is a National Phase filing under 35 U.S.C. §371 of PCT/IB2013/051407 filed on Feb. 21, 2013; and this application claims priority to Application No. 2012/01313 filed in South Africa on Feb. 22, 2012 under 35 U.S.C. §119; the entire contents of each application is hereby incorporated by reference.

FIELD OF THE INVENTION

This invention relates to apparatus for attaching a panel such as a glass panel to an adjacent supporting structure such as post. In particular, the invention relates to a clamp for a glass panel.

BACKGROUND TO THE INVENTION

Panels made of glass and/or other materials are often used in architectural applications where they need to be supported by adjacent structures, but where the attachment to the supports is preferably achieved by clamping the panels in fittings that are attached to the structures.

Glass panels are widely used in combination with adjacent structures in the form of stainless steel posts, because these elements share features of aesthetic appeal, strength, resistance to corrosion, etc. The fittings used to attach the glass panels to the stainless steel posts typically include two parts that are each cast and/or machined from solid stainless steel. The two parts can be attached to the adjacent post (e.g. with bolts) and can be moved closer together to clamp the glass panel between them.

Solid stainless steel glass panel clamps require large masses of costly material, especially if the stainless steel needs to be corrosion resistant and/or match the appearance of adjacent high quality stainless steel structures. Further, solid stainless steel glass panel clamps have rough finishes when removed from the moulds in which they are cast and they need to be sanded and polished—typically by hand. Solid stainless steel glass panel clamps need to be machined—at significant cost.

Instead of solid stainless steel castings, some hollow stainless steel castings have been used for glass panel clamps, but these clamps do not have adequate strength for most applications, e.g. to pass legislative tests for guard rail applications.

As an alternative to costly stainless steel castings, glass panel clamps have been made from polymeric materials that are chrome plated, but these clamps are generally inferior in strength and are also perceived as inferior in quality.

The present invention seeks to provide cost-effective, yet strong and appealing means for attaching glass or other panels to adjacent structures. The present invention seeks to provide cost-effective glass panel clamps that can pass legislative tests for guard rails and that can match the appearance and durability of high quality solid stainless steel glass panel clamps.

SUMMARY OF THE INVENTION

According to the present invention there is provided a fitting comprising:
a first clamp body defining a first grip formation and a first fastener aperture;
a second clamp body defining a second grip formation and a second fastener aperture;
said first and second clamp bodies being shaped and dimensioned such that, when they are in abutment, with the first and second fastener apertures aligned, the first and second clamp bodies form a combined body defining a recess between the first and second grip formations;
wherein each of said first and second clamp bodies comprises a composite plastics material covered by a pressed stainless steel shell.

Each of the clamp bodies may define more than one grip formation and/or more than one fastener aperture.

The pressed stainless steel shells may extend around the outer periphery of the combined body, apart from the recess and a surface of the combined body that is shaped to abut an adjacent structure such as a post.

The pressed stainless steel shells may define apertures that are aligned with the fastener apertures and may be recessed around said apertures. At least one of said recesses may have a non-round shape that is complementary to a fastener.

The composite plastics material may include a thermosetting material such as nylon, reinforced with fibre, such as glass fibre.

BRIEF DESCRIPTION OF THE DRAWINGS

For a better understanding of the present invention, and to show how the same may be carried into effect, the invention will now be described by way of non-limiting example, with reference to the accompanying drawings in which.

DETAILED DESCRIPTION OF THE DRAWINGS

Figure 1:
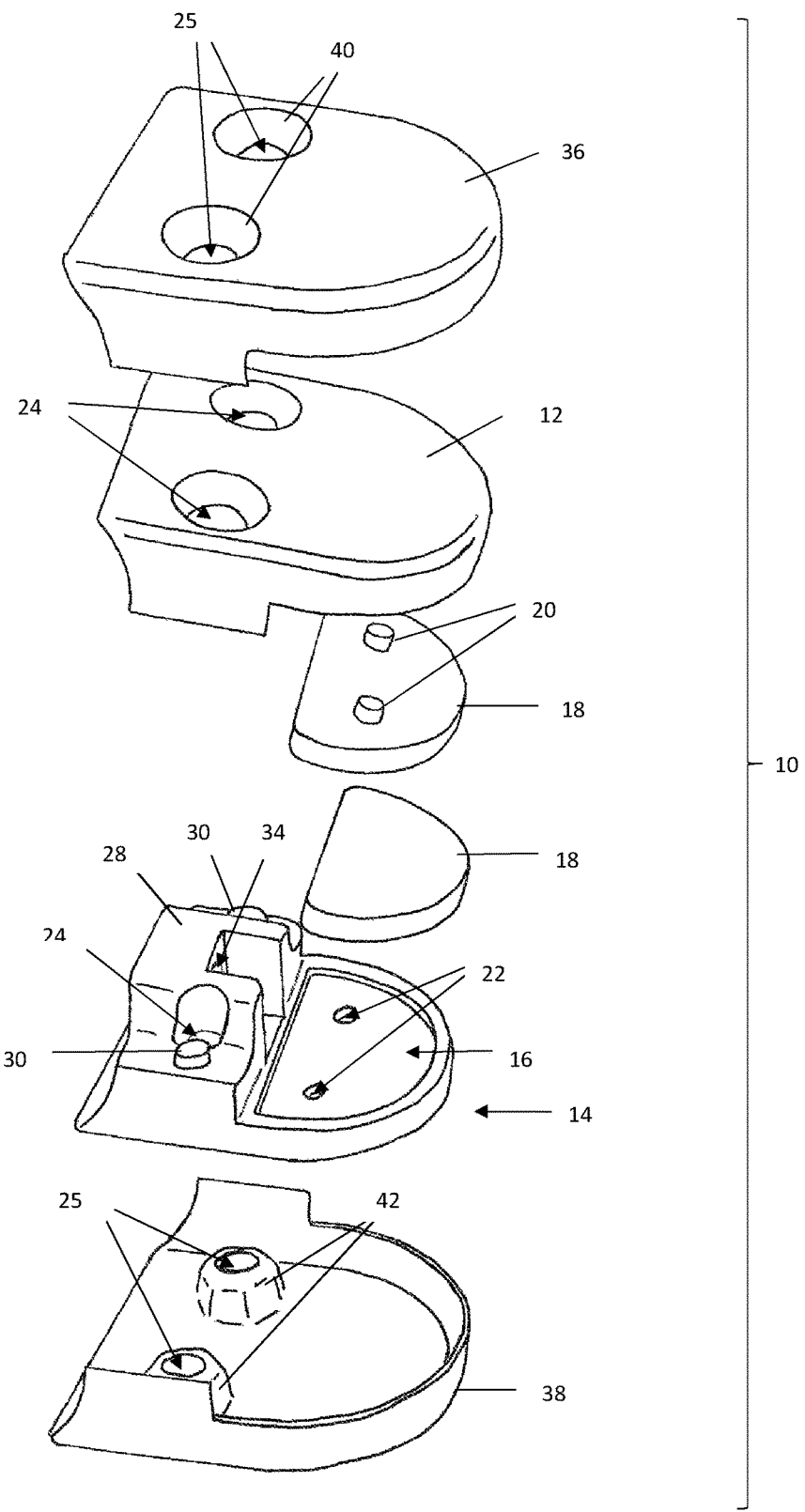
FIG. 1 shows an exploded view of a glass panel clamp in accordance with the present invention.
Figure 2:
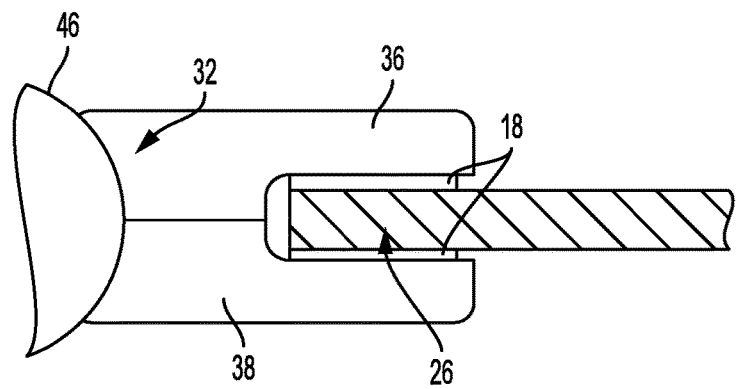
FIG. 2 shows a plan view of the glass panel clamp of FIG. 1, in use.

Referring to the drawings, a fitting in the form of a glass panel clamp in accordance with the present invention is generally indicated by reference numeral 10 (and is generally referred to merely as a "clamp" herein below).

The clamp 10 includes two bodies 12,14 that are made of a composite plastic material, e.g. a thermosetting material such as nylon, reinforced with fibre such as glass fibre. Each of these bodies 12,14 defines a grip formation in the form of a recess 16 in which a soft compressible pad 18 is receivable, with complementary studs 20 on the pads fitting into complementary recesses 22. Further, each of the bodies 12,14 defines two fastener apertures 24.

The first and second clamp bodies 12, 14 are shaped and dimensioned such that when they abut together and their respective fastener apertures 24 are aligned, they form a combined body, which defines a recess 26 between the pads 18 and which is recessed at a base 32 of the combined body, to form a part-cylindrical recess.

The part of the second body 14 that is in contact with the first body 12 includes a central raised part 28 and studs 30 on either side of the raised part and these formations are received in complementary shaped formations in the first body. An anchoring aperture 34 extends through the raised part 28 from the recess 26 to the recess at the base 32.

The clamp also includes two shells 36,38 that have been pressed from stainless steel plate. Each of the shells 36,38 extends around the outside of its associated body 12,14 so that the shells extend around the composite body, apart from the recess 26 and the part-cylindrical recess at the base 32 of the body. Each of the shells 36,38 also defines fastener recesses 25 that align with the fastener recesses of the bodies 12,14, when the clamp 10 is assembled.

The first shell 36 defines conical counter-sunk formations 40 around its fastener apertures 25 and the second shell 38 defines hexagonal recesses 42 around its fastener apertures. When the clamp has been assembled, fasteners such as screws with counter-sunk heads can be passed through the apertures 25, with their heads received in the counter-sunk formations 40 and with their screw threads protruding into the hexagonal recesses 42. Complementary nuts (preferably cap nuts) can be received in the recesses 42 and the screws can be fastened to the nuts to hold the shells 36,38 and bodies 12,14 together, while the heads and nuts are flush with the outsides of the clamp 10, without any unsightly protuberances. The clamp 10 can be used with a variety of other fasteners, with corresponding recesses in the shells 36,38—preferably with a non-round recess to prevent unwanted rotation of the fastener relative to one of the shells.

Figure 3:
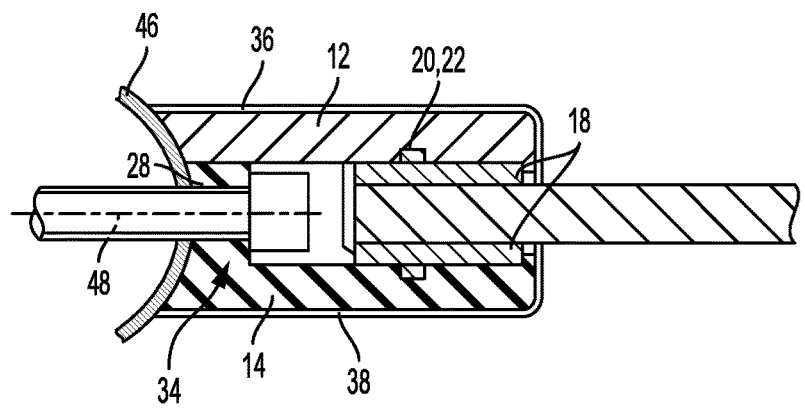
FIG. 3 shows a sectional view of the glass panel clamp of FIG. 2.

In use, when a sheet of glass 44 or other sheet material needs to be attached to or supported relative to an adjacent support such as an upstanding cylindrical post 46, the second body 14 is attached to the post by way of a fastener 48 extending through the aperture 34. In FIG. 3, a fastener in the form of a cap screw 48 is shown, but a wide variety of fasteners could be used. The first body 2, pads 18 and shells 36,38 are positioned relative to the second body 38 and the shells and bodies are attached together with screws passing through the fastener apertures 24,25. The glass sheet 44 is inserted into the recess 26 between the pads 18 and the crews are tightened to press the bodies 12,14 together—thereby narrowing the recess 26 and pinching the glass 44 between the pads 18. (The pads 18 are made of a sufficiently soft material, such as polyurethane, to ensure a distribution of the compressive loads on the glass 44 and to reduce the likelihood of cracking the glass.) Depending on the circumstances, the screws could first be attached loosely and then tightened once the glass 44 has been positioned or the clamp 10 can be assembled after the glass has been positioned.

The stainless steel plate from which the shells 36,38 is pressed, is very durable and the continuity of these plates on the outside of the clamp 10 has the result that the clamp resembles a solid stainless steel clamp in appearance. Yet, the clamp 10 can be produced at a fraction of the cost of a solid stainless steel clamp. Further, the internal formations of the bodies 12,14, including the recesses 16, 22, apertures 24,34 raised part 28, studs 30, and parts on the first shell 12 that are complementary to these parts, can all be moulded when manufacturing the bodies 12,14 and need not be machined at substantial cost—as would be the case with solid stainless steel clamps.

No major markings result from forming the shells 36,38 from stainless steel plate and the markings can typically be removed very cost-effectively with vibration polishing.

Despite not protruding on the outsides of the shells 36,38, the heads and nuts of the fixing screws passing through the apertures 24 apply their compressive forces on the outsides of the shells, which are distributed evenly in the generally rigid shells and are applied to the glass panel 44 via the softer polymeric bodies 12,14, which distributes the compressive loads. In the event of extreme forces applied to the clamp 10 and/or panel 44 the hard shells 36,38, combined with the bodies 12,14 compressed between them form a body with sufficient strength and rigidity to withstand forces exerted on the clamp 10. Yet, the softer, ductile nature of the bodies 12,14 acts as impact absorber or shock buffer and assists in distributing forces within the clamp 10 to prevent stress concentrations on the glass 44 and prevent mechanical failure of the clamp. Samples of the clamp 10 have passed destructive tests prescribed by South African legislation for guard rails and similarly, the clamp 10 is expected to meet or exceed similar requirements in other countries.

The weight of the stainless steel plate used for the shells 36,38 is relatively small for each clamp 10 and as a result, it makes up a relatively small part of input costs when manufacturing the clamps. As a result, high quality stainless steel can be used for the shells 36,38, providing a clamp 10 that is highly corrosion resistant and that can match the appearance, durability and perceived quality of surrounding high quality fittings—cost effectively.

The invention claimed is:

1. A fitting comprising:
   a first clamp body defining a first grip formation and a first fastener aperture;
   a second clamp body defining a second grip formation and a second fastener aperture; and
   at least one fastener;
   said first and second clamp bodies being shaped and dimensioned such that, when they are in abutment, with the first and second fastener apertures aligned, the first and second clamp bodies form a combined body defining a recess between the first and second grip formations;
   wherein each of said first and second clamp bodies comprises a composite plastics material covered by a pressed stainless steel shell, said composite plastics material being softer and more ductile than said stainless steel;
   wherein the pressed stainless steel shells define apertures that are aligned with the fastener apertures and the fastener extends through said apertures defined in the stainless steel shells and said fastener apertures, said fastener exerting a compressive force on the outsides of the stainless steel shells.

2. A fitting according to claim 1, wherein each of said clamp bodies defines more than one grip formation.

3. A fitting according to claim 2, wherein each of said clamp bodies defines more than one fastener aperture.

4. A fitting according to claim 2, wherein the pressed stainless steel shells extend around the outer periphery of the combined body, apart from the recess and a surface of the combined body that is shaped to abut an adjacent structure.

5. A fitting according to claim 2, wherein the composite plastics material includes a fibre reinforced thermosetting material.

6. A fitting according to claim 1, wherein each of said clamp bodies defines more than one fastener aperture.

7. A fitting according to claim 6, wherein the pressed stainless steel shells extend around the outer periphery of the combined body, apart from the recess and a surface of the combined body that is shaped to abut an adjacent structure.

8. A fitting according to claim 6, wherein the composite plastics material includes a fibre reinforced thermosetting material.

9. A fitting according to claim 1, wherein the pressed stainless steel shells extend around the outer periphery of the combined body, apart from the recess and a surface of the combined body that is shaped to abut an adjacent structure.

10. A fitting according to claim 1, wherein the pressed stainless steel shells are recessed around said apertures defined in the pressed stainless steel shells.

11. A fitting according to claim 10, wherein at least one of said recesses has a non-round shape that is complementary to the fastener.

12. A fitting according to claim 1, wherein the composite plastics material includes a fibre reinforced thermosetting material.

* * * * *